W. KLINE.
METHOD AND APPARATUS FOR MANUFACTURING TIRES.
APPLICATION FILED JAN. 10, 1922.

1,417,180.

Patented May 23, 1922.
2 SHEETS—SHEET 1.

Walter Kline
INVENTOR.

BY

Edwin P. Coates
ATTORNEY.

W. KLINE.
METHOD AND APPARATUS FOR MANUFACTURING TIRES.
APPLICATION FILED JAN. 10, 1922.

1,417,180.

Patented May 23, 1922.
2 SHEETS—SHEET 2.

Walter Kline
INVENTOR.

BY

Edwin P. Corbett
ATTORNEY.

UNITED STATES PATENT OFFICE.

WALTER KLINE, OF CHILLICOTHE, OHIO, ASSIGNOR TO THE KLINE ENGINEERING COMPANY, OF CHILLICOTHE, OHIO, A CORPORATION OF OHIO.

METHOD AND APPARATUS FOR MANUFACTURING TIRES.

1,417,180.  Specification of Letters Patent.  Patented May 23, 1922.

Application filed January 10, 1922. Serial No. 528,188.

*To all whom it may concern:*

Be it known that I, WALTER KLINE, a citizen of the United States of America, residing at Chillicothe, in the county of Ross and State of Ohio, have invented certain new and useful Improvements in Methods and Apparatus for Manufacturing Tires, of which the following is a specification.

My invention relates to a method and apparatus for manufacturing tires and has to do particularly with the provision of a novel type of tire core and mold structure for forming and tensioning cord tires, although it is equally well adapted for the manufacture of fabric or other standard tires.

In the past, in the manufacture of pneumatic tires, it has been the practice to "build-up" the tire casing by stretching layers of cord or fabric, with varying degrees of looseness, about a central forming core, pressing or kneading the layers together by a rolling process, applying external pressure to shape and vulcanize or cure the tire and then applying internal pressure to stretch or tension the tire casing. In all instances, resulting in satisfactory tire production, these central forming cores have been of a finished shape and in order to obtain the essential tensioning of the casing it has been necessary to remove the central core and insert "air-bags" or to provide a special and expensive core utilizing compressed air. On the other hand, it has frequently been the custom, after the raw casing has been formed about the finished-size core, to remove the core and utilize air-bags or compressed air to expand the casing against the mold during vulcanization. This use of interior air pressure during vulcanization has presented certain difficulties, aside from the increased cost of production, in that the proper curing of tires requires a greater pressure than that available by direct air pressure.

Furthermore, in cases where the central core has been initially provided with spacing means, attempts have been made to initially separate the edge or bead of the tire during the building-up process and then remove the spacing means to effect the stretching of the tire during vulcanization. This final stretching of the bead of the tire has resulted in a stretching of the tire from points below the horizontal center in a downward direction only and thus not preventing the possibility of buckling in the upper section of the tire, particularly in cord tires, and only increasing the possibility of rim-cutting in the section of the tire just above the bead.

My invention has to do primarily with the method of forming a tire upon a core of finished contour and then distorting the contour of this tire casing to effect a tensioning or stretching action throughout every section of the casing. This novel method of forming and tensioning tires is accomplished by means of a very simple, substantial, and compact structure which comprises a non-compressible means integral with the finished core to maintain the approximately regular finished interior contour of the casing during the rolling or stitching action and a novel mold for insuring proper tensioning during and after vulcanization.

One of the objects of my invention is the provision of a novel tire core of a non-compressible material, a section of which core is removable to effect distortion of the tire casing.

Another object of my invention is the provision of a tire core, channels on each side of the core and non-compressible inserts adapted to be inserted in the channels whereby the layers of rubber and cord or fabric may be placed around the core and rolled or kneaded to any desired extent, and the inserts removed prior to vulcanization to permit distortion and tensioning of the tire casing. The result is that the raw tire form may be rolled to any extent and with any amount of pressure and the resulting inner surface of the casing will always be of the same size due to the non-compressibility of the inserts.

Another object of my invention has to do with the provision of means for pressing a section of the tire casing into the cavity formed by the removal of the non-compressible inserts prior to and during the process of vulcanization.

A still further object of my invention has to do with the provision of a tire core of substantially finished contour, a portion of the finished sized core being removable to receive and distort a section of the tire casing, and the cavity formed by the removed portion being so shaped and positioned as to properly tension every part of the casing.

Various other features of my invention will be apparent as this description progresses and will be brought out in the claim appended thereto. The various objects of my inventions are preferably obtained by the structure illustrated in the drawings wherein similar characters of reference designate corresponding parts and wherein Figure 1 is a cross-section of the various parts of my novel tire forming structure in relative assembly.

Figure 1:
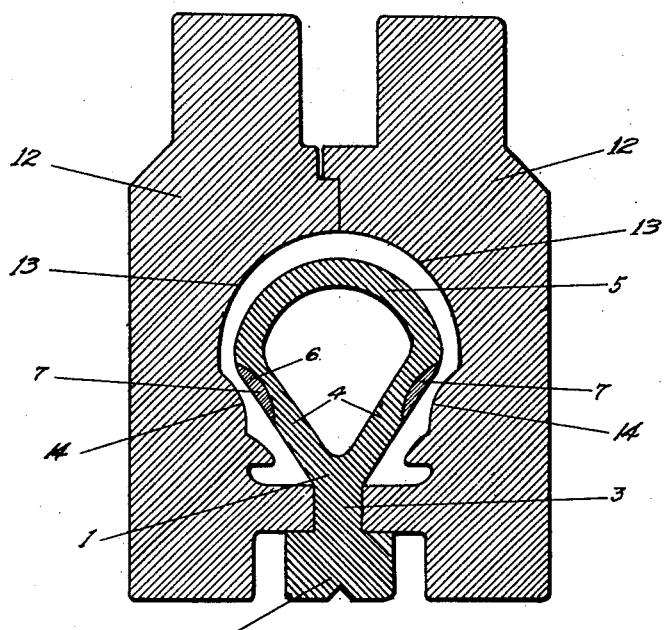

In the drawings, my tire forming and tensioning device is shown as comprising a simple and compact central tire core structure and a single outer unit or mold structure. This central tire core is preferably of ring design and may be designated 1. It comprises an annular base or flange 2, a web 3, outwardly and upwardly inclined sides 4, and a rounded part 5 forming the top section thereof.

Figures 2, 3, 4:
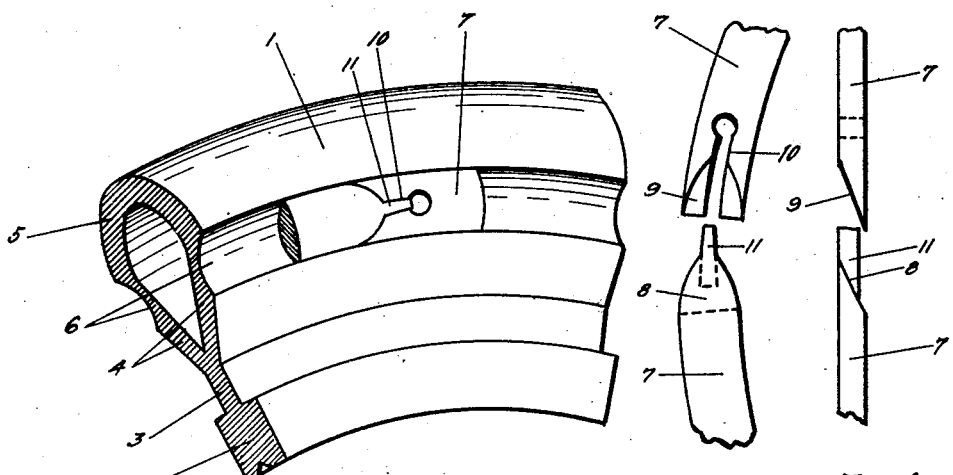
Figure 2 is a perspective view of a section of my tire core and showing a fragmentary section of the interlocking insert mounted thereon.
Figure 3 is a detail fragmentary view of the tire core insert and showing the manner of securing the ends thereof.
Figure 4 is a side elevation of the structure shown in Figure 3.

In the inclined sides 4, and just below the juncture with the semi-circular top section 5, I have provided concave annular channels 6, as best shown in Figure 2. Adapted to fit into the channels 6 and to form substantially an integral part of the core 1, are the inserts 7.

These inserts are each preferably made of a metallic or other non-compressible material and formed in two sections and are so shaped that their inner sides are convex so as to securely fit the channels 6 while their outer surfaces lie in the same plane with adjacent surfaces of the core. When in place the outer surfaces of the inserts complete the outer contour of the core so that the shape of the complete core is of a finished contour or, in other words, substantially the same shape as the contour of the interior of the finished tire casing.

Each section or each half of the insert 7 is provided with oppositely tapered ends 8 and 9 designed to fit or bear against the tapered ends of the other half of the insert, as best shown in Figures 2, 3 and 4. One end 9 of each half of the insert is provided with a tapered slot 10 designed to receive and secure a tapered key 11 mounted on the registering end 8 of the other half of the inserts. Thus, it will be evident that in forming a tire around the complete core 1 the interior of the tire will always be smooth and of substantially finished size as long as the inserts 7 are secured in the channels 6, also, by holding the edge of the tire away from the core and separating the ends of the insert sections, it will be seen that the insert halves may be overlapped and thus easily removed for subsequent distortion and vulcanization of the tire.

In order to properly tension and vulcanize the tire casing I have provided a tire mold, of novel design and formed in two sections or halves 12, as best shown in Figure 1. Each mold section is provided with a symmetrical mold or die surface 13, which conforms with the exact outside shape and bead of the tire, with the exception of a convex extension 14, in horizontal alignment with channels 6 of the core. These convex portions 14 of the mold are similar in shape to the concave channels 6 and are so positioned that when pressure is applied to the mold section for vulcanizing the tire, the sections of the tire casing covering the channels 6 will be distorted by the convex extensions 14 and pressed against the concave surface of the channels.

Figure 8:
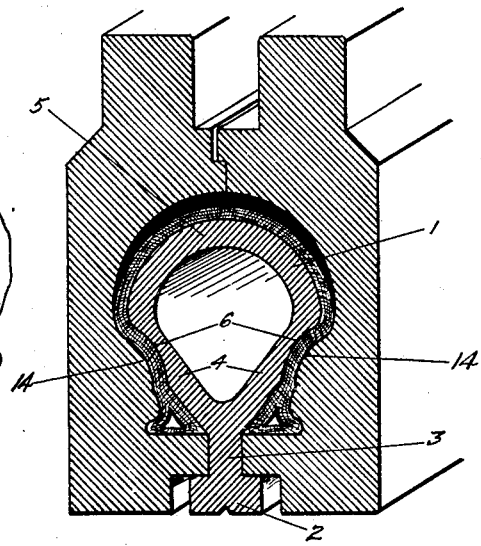
Figure 8 is a detail perspective view of the structure shown in Figure 7 but showing the mold in practically closed position and also showing the preferred manner of distorting the tire during vulcanization.

It will be apparent that, in distorting the tire by means of the convex extension 14, the tire casing will be subject to transverse stretching action in four directions. For example, referring to Figure 8, distortion of the tire casing as at 14 will stretch the top part of the tire downwardly on each side of the top center thereof and will stretch the two lower edges of the tire upwardly.

Figure 6:
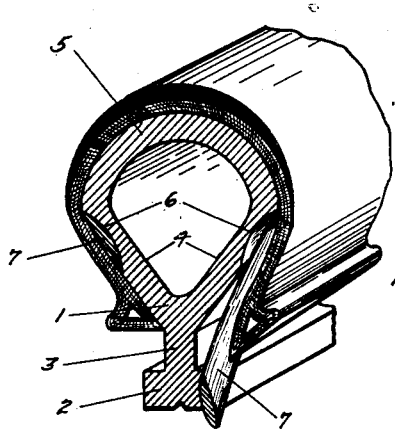
Figure 6 is a perspective view of a section of my complete tire core with a raw tire formed thereon and showing the manner of removing the inserts after the tire has been built-up around the core.

In building up a tire, the non-compressible inserts 7 are placed in the channels 6 on each side of the core 1, and the successive layers of cord or fabric are applied around the core in the usual manner. The breaker strip and outer section are then applied and the raw tire casing is stitched or rolled to knead the various layers together. As different tires will require various rolling pressures, it will be apparent that as the non-compressible inserts 7 are formed integral with the finished tire core 1, the interior of the rolled raw casing will be smooth and of substantially finished size, as will be particularly noted in Figure 6. Following the rolling of the raw tire the inserts 7 are removed by pulling the lower edge or bead of the tire away from the core and prying the insert sections apart, thus enabling them to be easily slipped out from beneath the casing edges.

Figure 7:
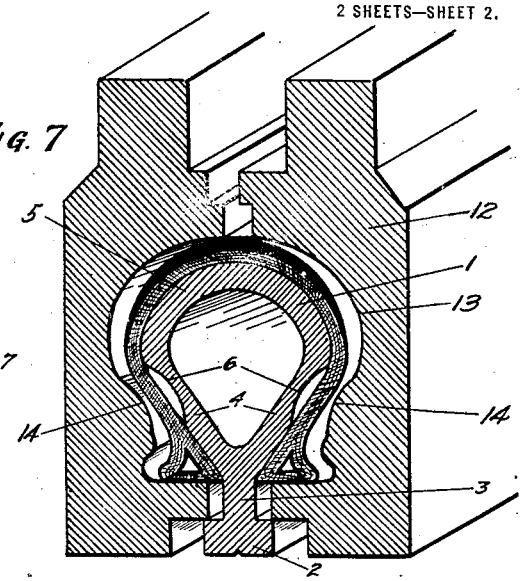
Figure 7 is a detail perspective view similar to Figure 6 but showing the inserts removed and the mold sections preparatory to closing-in upon the tire.

When the raw tire is so formed about the core with the inserts removed, the mold sections are applied to the tire as shown in Figure 7. Closing of the mold and the subsequent pressure applied during the vulcanization process will force a section of each side of the tire into the cavities formed by the channels 6. As the bead rings are securely held in place by the bottom coutour of the mold it will be obvious that the distortion of the sides of tire, at a point, above the beads, will produce a transverse seretching of all the layers of fabric or cord and a positive stretching of every section of each layer.

Figure 5:
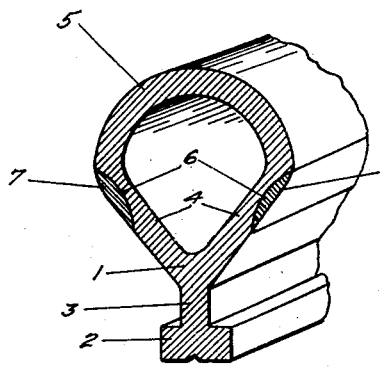
Figure 5 is a perspective view of a section of the tire core showing the inserts in place to complete the finished contour of the core.

It will be understood that the outer contour of the complete assembled core, as, shown in Figures 1 and 5, is substantially the same regular contour as the interior of the finished tire casing after vulcanization. In other words, the built-up tire casing, as shown in Figure 7, will be the same shape before and after vulcanization, with the exception that the finished tire casing may be slightly larger, due to the stretching action caused by temporarily distorting a portion of the tire.

It will be seen that I have provided a novel and decidedly simple tire forming and tensioning device which is of amply strong construction and well adapted to the forming, vulcanizing and tensioning of both cord and fabric tires.

It will be further noted that the tire is formed upon a core of the approximately regular finished contour of the tire casing and that, in distorting this tire casing at points between the top and bottom of the tire, I have provided stretching means that will equally stretch every part of each layer of cord or fabric. This equal transverse stretching of every part of the tire insures a uniform stretching of each layer and a proper proportioning of every part of the tire in accordance with the mold and core design, and thus will positively eliminate all possibility of buckling, rim-cutting or other similar tire irregularities.

It wll further be noted that in vulcanizing the core by applying pressure directly by means of molds against a solid central core, I have made it possible to cure and tension tires under a much greater pressure than by the use of air-bags or the like, and with the result that there is less separation of plies and a subsequent prolonging of the life of the tire.

Furthermore, it will be obvious that the combination of my simple tire forming structure together with the simple and positive method of forming and tensioning the tires will make possible the building of a substantial, perfectly tensioned tire with a much cheaper production cost.

Obviously, my invention may take many different forms, in that the general shape of the core and mold structure and the relative positioning of the tensioning means may be changed in accordance with the kind and nature of the tire to be formed. All such changes however, are within the scope of the appended claims.

Having thus described my invention, what I claim is:

1. The method of forming tires, which consists in forming the tire casing about a core, removing a part of this core and pressing a portion of the tire into the cavity formed by the removed part of the core.

2. The method of forming tires, which consists in forming the tire about a core of the approximate contour of the finished tire, removing part of the core, and then applying pressure to the exterior of the tire.

3. The method of forming and tensioning tires, which consists in building up a tire about a core of the approximate contour of the finished tire, removing part of this core and then distorting a portion of this contour of the tire.

4. The method of forming and tensioning tires, which consists in building up a tire about a non-compressible core of a definite contour, removing part of this core, and then distorting the contour of the tire at intermediate points.

5. A tire former comprising a tire core, a channel formed on the side of said core, an insert adapted to fit in said channel and a mold designed to press a portion of said tire into said channel after removal of said insert.

6. A tire former comprising a core, a portion of said core being removable for the reception of a section of said tire and a mold for pressing said tire section into the cavity formed by said removable portion.

7. A tire core for forming tires, comprising a core shaped to fit the interior of a finished tire casing, a portion of said core being removable whereby a section of said tire may be pressed into the cavity formed by said removed portion to permit stretching of the tire.

8. The method of forming tires which consists in building up a tire about a core of the same contour as the finished tire interior and of such a form that the compressing of the layers together will be against a rigid foundation at all points, and then distorting a portion of the tire during vulcanization.

9. The method of forming tires which consists in forming a tire about a core of regular contour approximating the shape of the tire, producing a depression in said core, and forcing the superimposed portions of said tire into said depressions to stretch the tire.

10. The method of forming tires which consists in building up a tire about a core of substantially the same size and regular contour of a finished tire interior, and distorting a portion of the tire.

11. A tire core for forming tires, comprising a core adapted to shape the interior of the tire casing to a substantially regular and finished contour, and a portion removable to permit distortion of said tire.

12. A tire core for forming tires, comprising a core adapted to shape the interior of the tire casing to a substantially regular and finished contour, and a non-compressible portion removable to permit distortion of said tire.

In testimony whereof I hereby affix my signature.

WALTER KLINE.